United States Patent
Li

(10) Patent No.: US 10,570,873 B2
(45) Date of Patent: Feb. 25, 2020

(54) IGNITION SYSTEM FOR TANDEM-TYPE HYBRID VEHICLE

(71) Applicants: ZHEJIANG GEELY HOLDING GROUP CO., LTD, Hangshou (CN); Zhejiang Geely Automobile Research Institute Co., Ltd, Taizhou (CN)

(72) Inventor: Shufu Li, Hangzhou (CN)

(73) Assignees: ZHEJIANG GEELY HOLDING GROUP CO,. LTD, Hangzhou (CN); ZHEJIANG GEELY AUTOMOBILE RESEARCH INSTITUTE CO., LTD, Taizhou (CN)

( * ) Notice: Subject to any disclaimer, the term of this patent is extended or adjusted under 35 U.S.C. 154(b) by 352 days.

(21) Appl. No.: 15/557,741

(22) PCT Filed: Feb. 19, 2016

(86) PCT No.: PCT/CN2016/074147
§ 371 (c)(1),
(2) Date: Sep. 12, 2017

(87) PCT Pub. No.: WO2016/141802
PCT Pub. Date: Sep. 15, 2016

(65) Prior Publication Data
US 2018/0066623 A1    Mar. 8, 2018

(30) Foreign Application Priority Data

Mar. 12, 2015   (CN) .................... 2015 2 0141678 U

(51) Int. Cl.
*F02P 3/05*    (2006.01)
*B60K 5/08*    (2006.01)
(Continued)

(52) U.S. Cl.
CPC .................... *F02P 3/05* (2013.01); *B60K 5/08* (2013.01); *B60K 6/28* (2013.01); *F02P 3/01* (2013.01);
(Continued)

(58) Field of Classification Search
CPC ...... F02P 3/05; F02P 9/002; F02P 3/01; F02P 3/0435; F02P 9/005; F02P 7/035;
(Continued)

(56) References Cited

U.S. PATENT DOCUMENTS 4,970,873 A    11/1990 Aisin
4,977,876 A    12/1990 Nanyoshi et al.
(Continued)

FOREIGN PATENT DOCUMENTS

CN    101450660 A    6/2009
CN    102275493 A    12/2011
(Continued)

OTHER PUBLICATIONS

International Search Report and Written Opinion from International Application No. PCT/CN2016/074147, dated Apr. 28, 2016, 8 pages.

*Primary Examiner* — Joseph J Dallo
(74) *Attorney, Agent, or Firm* — Alston & Bird LLP

(57) ABSTRACT

An ignition system for a tandem-type hybrid vehicle. The tandem-type hybrid vehicle comprises a plurality of engines (100, 110, 120, 130, 140, 150). The ignition system comprises: a plurality of ignition coils (101), each of the engines being configured to have at least one of the ignition coils, and each of the ignition coils comprising a primary winding and a secondary winding which are mutually matched; a single igniter (200) provided with a plurality of output ports (103) with the quantity corresponding to that of the plurality of ignition coils, each of the output ports being connected to the primary winding of one corresponding ignition coil so as (Continued)

to control the connection and disconnection of a current in the primary winding of the ignition coil; and an electronic control unit (300) for determining, according to a current power demand of the tandem-type hybrid vehicle, the engine to be started in the plurality of engines, determining the ignition coil to be boosted in the ignition coils in the engine to be started and issuing a corresponding ignition instruction, wherein the single igniter controls, according to the ignition instruction, the connection and disconnection of the current in the primary winding of the corresponding ignition coil to be boosted.

10 Claims, 2 Drawing Sheets

(51) Int. Cl.
| | |
|---|---|
| *B60K 6/28* | (2007.10) |
| *F02P 3/01* | (2006.01) |
| *F02P 9/00* | (2006.01) |
| *B60W 20/13* | (2016.01) |
| *F02D 25/02* | (2006.01) |

(52) U.S. Cl.
CPC ............ *F02P 9/002* (2013.01); *B60W 20/13* (2016.01); *F02D 25/02* (2013.01)

(58) Field of Classification Search
CPC . F02P 5/1506; B60K 6/28; B60K 5/08; B60K 6/00; F02D 25/02; F02D 25/00; B60W 20/13; F02N 11/0814
See application file for complete search history.

(56) References Cited

U.S. PATENT DOCUMENTS

| | | | | |
|---|---|---|---|---|
| 5,109,829 | A * | 5/1992 | Herden | F02P 7/035 |
| | | | | 123/146.5 A |
| 5,239,973 | A * | 8/1993 | Murata | F02P 3/04 |
| | | | | 123/635 |
| 5,558,071 | A * | 9/1996 | Ward | F02P 3/02 |
| | | | | 123/598 |
| 5,571,245 | A * | 11/1996 | Ooyabu | F02P 3/0442 |
| | | | | 123/630 |
| 6,935,115 | B2 | 8/2005 | Anderson | |
| 2001/0037801 | A1* | 11/2001 | Ito | F02P 3/04 |
| | | | | 123/644 |
| 2003/0087448 | A1* | 5/2003 | Abe | G01F 1/684 |
| | | | | 436/73 |
| 2005/0126173 | A1 | 6/2005 | Anderso | |
| 2005/0266957 | A1* | 12/2005 | Kamijo | B60K 6/445 |
| | | | | 477/3 |
| 2005/0268887 | A1 | 12/2005 | Campbell | |
| 2006/0218896 | A1* | 10/2006 | Ando | B60K 6/445 |
| | | | | 60/277 |
| 2007/0050120 | A1* | 3/2007 | Tabata | B60K 6/44 |
| | | | | 701/80 |
| 2008/0148835 | A1* | 6/2008 | Akimoto | B60K 6/445 |
| | | | | 73/116.01 |
| 2008/0184697 | A1 | 8/2008 | Kojima et al. | |
| 2008/0216465 | A1* | 9/2008 | Ando | F02D 41/0255 |
| | | | | 60/284 |
| 2009/0030595 | A1* | 1/2009 | Sugai | B60K 6/445 |
| | | | | 701/112 |
| 2009/0093940 | A1* | 4/2009 | Ichimoto | B60K 6/445 |
| | | | | 701/102 |
| 2009/0105043 | A1* | 4/2009 | Muta | B60W 20/13 |
| | | | | 477/97 |
| 2009/0256513 | A1* | 10/2009 | Ando | B60K 6/445 |
| | | | | 318/478 |
| 2009/0259391 | A1* | 10/2009 | Ando | F02P 5/1506 |
| | | | | 701/113 |
| 2010/0087288 | A1* | 4/2010 | Yamamoto | B60K 6/365 |
| | | | | 477/3 |
| 2010/0152938 | A1* | 6/2010 | Aoki | B60K 6/445 |
| | | | | 701/22 |
| 2010/0251996 | A1* | 10/2010 | Akimoto | B60K 6/445 |
| | | | | 123/406.23 |
| 2010/0256849 | A1* | 10/2010 | Akimoto | B60K 6/445 |
| | | | | 701/22 |
| 2012/0176723 | A1* | 7/2012 | Ikeda | F02P 3/01 |
| | | | | 361/253 |
| 2013/0226389 | A1* | 8/2013 | Yamazaki | B60K 6/445 |
| | | | | 701/22 |
| 2018/0066623 | A1* | 3/2018 | Li | B60K 6/00 |

FOREIGN PATENT DOCUMENTS

| | | |
|---|---|---|
| CN | 103552459 A | 2/2014 |
| CN | 104100390 A | 10/2014 |
| CN | 204610119 U | 9/2015 |
| EP | 2067966 A1 | 6/2009 |
| GB | 2115873 A | 9/1983 |
| JP | H07500065 A | 1/1995 |
| JP | H10332142 A | 12/1998 |
| JP | H11230017 A | 8/1999 |
| JP | 2009019577 A | 1/2009 |

\* cited by examiner

IGNITION SYSTEM FOR TANDEM-TYPE HYBRID VEHICLE

CROSS-REFERENCE TO RELATED APPLICATIONS

This application is a national phase entry of International Application No. PCT/CN2016/074147, filed Feb. 19, 2016, which claims priority to Chinese Application No. 201520141678.1, filed Mar. 12, 2015, the entire contents of which are incorporated herein by reference.

TECHNICAL FIELD

The present invention relates to an ignition system, and more particularly to an ignition system for a tandem-type hybrid vehicle.

BACKGROUND OF THE INVENTION

The inventor has proposed in the earlier Chinese patent application No. CN 201310467918.2 a power system of a tandem-type hybrid vehicle, the power system of a tandem-type hybrid vehicle using two or more independently controllable auxiliary power units, wherein each of the auxiliary power units comprises an engine, and the tandem-type hybrid vehicle can be provided with an appropriate number of engines used in combination as needed, which simply and reliably solve the problem that the power and torque of a previous single engine are limited and cannot meet the high power and torque requirements of vehicles. The inventor found in the test on the tandem-type hybrid vehicle that a large number of engines will result in a reduction in the available space in the tandem-type hybrid vehicle, affecting the experience of passengers in the vehicle.

SUMMARY OF THE INVENTION

It is an object of the present invention to increase the available space in the tandem-type hybrid vehicle as much as possible.

It is a further object of the present invention to reduce the costs of tandem-type hybrid vehicles.

In particular, the present invention provides an ignition system for a tandem-type hybrid vehicle, the tandem-type hybrid vehicle comprising a plurality of engines, the ignition system comprising:

a plurality of ignition coils, each of the engines being configured to have at least one of the ignition coils, and each of the ignition coils comprising a primary winding and a secondary winding which are mutually matched;

a single igniter provided with a plurality of output ports with the quantity corresponding to that of the plurality of ignition coils, each of the output ports being connected to the primary winding of one corresponding ignition coil so as to control the connection and disconnection of a current in the primary winding of the ignition coil; and an electronic control unit for determining, according to a current power demand of the tandem-type hybrid vehicle, the engine to be started in the plurality of engines, determining the ignition coil to be boosted in the ignition coils in the engine to be started and issuing a corresponding ignition instruction, wherein the single igniter controls, according to the ignition instruction, the connection and disconnection of the current in the primary winding of the corresponding ignition coil to be boosted.

Further, the ignition system also comprises:

a plurality of spark plugs, each of the engines being configured to have the spark plugs with the quantity corresponding to that of cylinders of the engine.

Further, the secondary winding of each of the ignition coils is connected to one of the spark plugs so as to provide the spark plug with a high voltage required for sparkover individually.

Further, the secondary winding of each of the ignition coils is connected to two of the spark plugs so as to provide the two spark plugs with a high voltage required for sparkover simultaneously.

Further, the two cylinders in which the two spark plugs are located are configured such that, when one of the cylinders is in a compression stroke, the other is in an exhaust stroke.

Further, the electronic control unit is provided with ignition instruction output ports with the quantity corresponding to that of the plurality of ignition coils, each of the ignition instruction output ports being capable of transmitting, to the igniter, the corresponding one of the ignition instructions issued by the electronic control unit.

Further, the ignition system further comprises:

a crank angle sensor;

an air flow meter;

a water temperature sensor;

a throttle switch;

an ignition switch;

a vehicle speed sensor; and a storage battery.

According to the concept of the present invention, the number or volume of elements in the ignition system should be minimized to achieve the purpose of increasing the available space in the tandem-type hybrid vehicle. In particular, in the ignition system of the present invention, the connection and disconnection of the current in the primary windings of the plurality of ignition coils are controlled by the single igniter, that is to say, in the present invention, the feature of each engine matching one igniter is modified into the feature of a plurality of engines matching one igniter, which greatly saves the number of igniters in the ignition system, thereby reducing the overall space occupied by the ignition system, increasing the available space in the tandem-type hybrid vehicle, and improving the experience of passengers in the vehicle. In addition, since the number of igniters in the ignition system is reduced, the production costs of the tandem-type hybrid vehicle is also decreased.

Still further, in a twin-cylinder engine according to an embodiment of the present invention, the secondary winding of one of the ignition coils is connected to spark plugs of two cylinders so that the ignition coil can provide the two spark plugs with a high voltage required for sparkover simultaneously. With such an arrangement, each of the engines is provided with a common ignition coil, thereby reducing the overall space occupied by the ignition system and reducing the production costs of the tandem-type hybrid vehicle.

According to the detailed description of the particular embodiments of the present invention below in conjunction with the accompanying drawings, the above-mentioned and other objects, advantages and features of the present invention will be more clear to a person skilled in the art.

BRIEF DESCRIPTION OF THE DRAWINGS

Some of the particular embodiments of the present invention will be described below in detail in an exemplary but not limiting way with reference to the accompanying drawings. In the accompanying drawings.

DETAILED DESCRIPTION OF THE INVENTION

Figure 1:
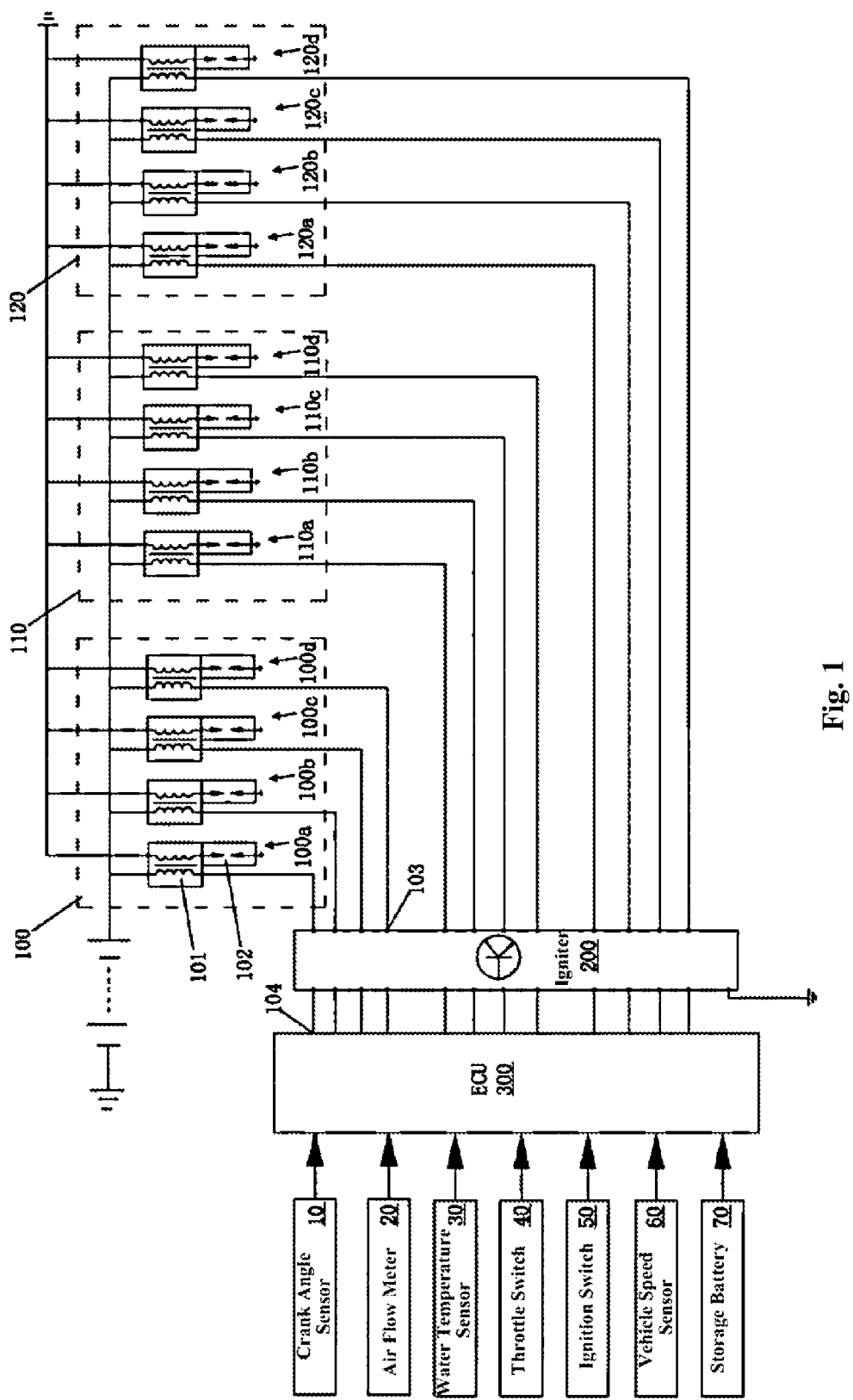
FIG. 1 is a schematic structure diagram of an ignition system according to an embodiment of the present invention, in which the secondary winding of each of the ignition coils is connected to one spark plug.
Figure 2:
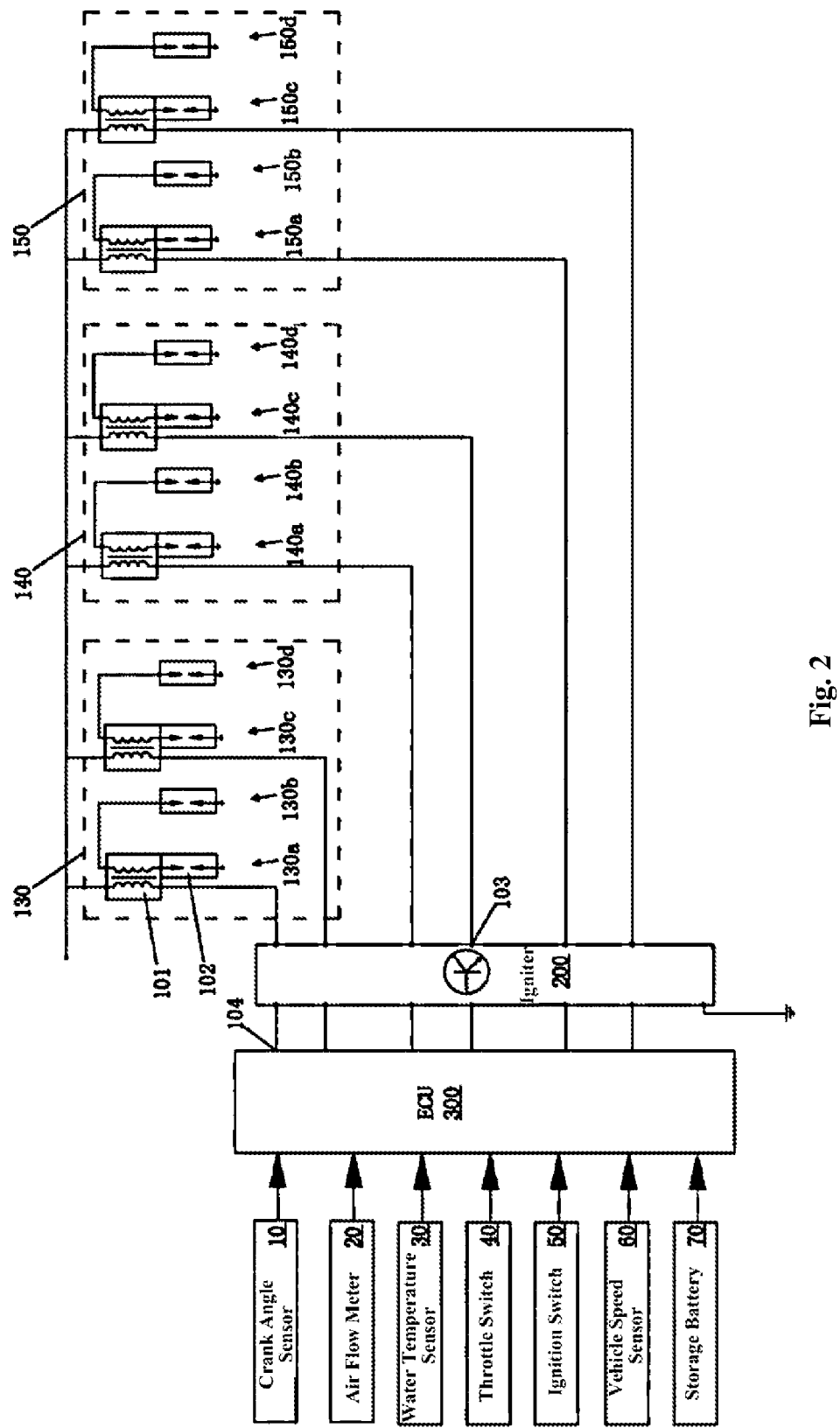
FIG. 2 is a schematic structure diagram of an ignition system according to another embodiment of the present invention, in which the secondary winding of each of the ignition coils is connected to two spark plugs.

As shown in FIGS. 1 and 2, the tandem-type hybrid vehicle involved in the present invention may generally comprise a plurality of engines, an ignition system of the tandem-type hybrid vehicle comprising an ignition coil 101, an igniter 200, and an electronic control unit (ECU) 300.

Here, the number of the ignition coils 101 is set to be multiple, in particular, each engine of the engine is configured to have at least one ignition coil 101, each of the ignition coils 101 comprising a primary winding and a secondary winding which are mutually matched, and the primary winding and the secondary winding are the prior art in the field, which will not be described further here.

Here, the number of the igniters 200 is set to be one, the igniter 200 is to arranged between the respective engine and the ECU 300, and the ECU 300 will be described in detail below. The igniter 200 is connected with the ignition coil 101, and the igniter 200 is provided with a plurality of output ports 103 with the quantity corresponding to that of the ignition coils 101, and each of the output ports 103 being connected to the primary winding of the corresponding one of the ignition coils 101 so as to control the connection and disconnection of a current in the primary winding of the ignition coil 101.

Here, the ECU 300 determines, according to a current power demand of the tandem-type hybrid vehicle, the engine to be started in the plurality of engines, including the number and power of the engine to be started. After the engine to be started is determined, it is possible to specifically determine the ignition coil 101 to be boosted in the ignition coils 101 in the engine to be started and issue a corresponding ignition instruction, the igniter 200 controls, according to the ignition instruction, the connection and disconnection of the current in the primary winding of the corresponding ignition coil 101 to be boosted (the current flowing through the secondary winding is interrupted at a predetermined time according to the ignition instruction so as to generate a high voltage in the secondary winding matched thereto, the secondary winding supplies the high voltage to one of the spark plugs connected thereto, and the spark plug is excited by the high voltage to generate a spark). For example, when the engine is provided with a plurality of cylinders and the plurality of cylinders are ignited separately, the ECU 300 needs to determine the number of the engines to be started and determines the cylinder to be ignited, and preferably, the cylinders of the same engine are first started so as to minimize the number of the engines to be started.

It can be seen from FIGS. 1 and 2 that each of the engines is configured to have spark plugs 102 with the quantity corresponding to the number of cylinders of the engine, each of the spark plugs 102 being connected to a secondary winding. In particular, in FIG. 1, the secondary winding of each of the ignition coils 101 is connected to a spark plug 102 so as to independently provide the spark plug 102 with a high voltage required for sparkover. That is to say, in FIG. 1, a cylinder-A 100a, a cylinder-B 100b, a cylinder-C 100c and a cylinder-D 100d of an engine-A 100 can be ignited independently. Similarly, a cylinder-A 110a, a cylinder-B 110b, a cylinder-C 110c and a cylinder-D 110d of an engine-B 110 can be ignited independently, and a cylinder-A 120a, a cylinder-B 120b, a cylinder-C 120c and a cylinder-D 120d of an engine-C 120 can also be ignited independently. With such arrangement, the ECU 300 can flexibly determine the number of the engines to be started and determine the cylinders to be ignited, and the operation between the cylinders will not affect each other. In FIG. 2, the secondary winding of each of the ignition coils 101 is connected to two spark plugs 102 so as to simultaneously provide the two spark plugs 102 with a high voltage required for sparkover. It should be noted that the two cylinders where the two spark plugs 102 are located are configured so that, when one of the cylinders is in a compression stroke, the other is in an exhaust stroke, that is to say, the cylinder in the exhaust stroke is in an ineffective ignition. For example, in FIG. 2, an engine-D 130 comprises a cylinder-A 130a, a cylinder-B 130b, a cylinder-C 130c and a cylinder-D 130d, in which the cylinder-A 130a and the cylinder-B 130b are connected to the same ignition coil 101, the cylinder-C 130c and the cylinder-D 130d are connected to another ignition coil 101, when the cylinder-A 130a is in the compression stroke, the cylinder-B 130b is in the exhaust stroke, and when the cylinder-C 130c is in the compression stroke, the cylinder-D 130d is in the exhaust stroke. Similarly, in an engine-E 140, a cylinder-A 140a and a cylinder-B 140b are connected to the same ignition coil 101, a cylinder-C 140c and a cylinder-D 140d are connected to another ignition coil 101, when the cylinder-A 140a is in the compression stroke, the cylinder-B 140b is in the exhaust stroke, and when the cylinder-C 140c is in the compression stroke, the cylinder-D 140d is in the exhaust stroke. In an engine-F 150, a cylinder-A 150a and a cylinder-B 150b are connected to the same ignition coil 101, a cylinder-C 150c and a cylinder-D 150d are connected to another ignition coil 101, when the cylinder-A 150a is in the compression stroke, the cylinder-B 150b is in the exhaust stroke, and when the cylinder-C 150c is in the compression stroke, the cylinder-D 150d is in the exhaust stroke.

In other embodiments, it is also possible to provide the secondary winding of each of the ignition coils 101 in a portion of the ignition coils 101 to be connected to one spark plug 102 so as to independently provide the spark plug 102 with a high voltage required for sparkover, and provide the secondary winding of each of the ignition coils 101 in the other portion of the ignition coils 101 to be connected to two spark plugs 102 so as to simultaneously provide the two spark plugs 102 with a high voltage required for sparkover.

As mentioned above, the igniter 200 is provided with a plurality of output ports 103 with the quantity corresponding to that of the ignition coil 101. Correspondingly, the ECU 300 is provided with ignition instruction output ports 104 with the quantity corresponding to that of the ignition coils 101, each of the ignition instruction output ports 104 capable of transmitting, to the igniter 200, the corresponding one of the ignition instructions issued by the ECU 300 and further transmitting to the corresponding ignition coil 101 by means of the igniter 200.

It can be seen from FIGS. 1 and 2 that the ignition system may further comprise a crank angle sensor 10, an air flow meter 20, a water temperature sensor 30, a throttle switch 40, an ignition switch 50, a vehicle speed sensor 60 and a storage battery 70. Here, the crank angle sensor 10 determines the crank angle, and cooperates with a camshaft position sensor to determine the ignition timing. The air flow meter 20 converts the intake air flow rate into an electric signal which is transmitted to the ECU 300 to serve as one of the basic signals for determining the fuel injection, and is a sensor for measuring the intake air flow rate of the engine. The water temperature sensor 30 is used to measure the operating temperature of the engine. The throttle switch 40 is used to control the intermittent entry of air into the engine. The ignition switch 50 is used to turn on or off the ignition coil. The vehicle speed sensor 60 is used to measure the real-time speed of the vehicle. The storage battery 70 is used to supply power to the vehicle. These elements are connected directly or indirectly to the ECU 300 in a general manner, and will not be described further here.

Up to this, a person skilled in the art should recognize that although a plurality of exemplary embodiments of the present invention have been shown and described in detail herein, numerous other variations or modifications meeting the principle of the present invention can be directly determined or derived according to the contents disclosed in the present invention. Therefore, the scope of the present invention should be construed and considered as covering all of such other variations or modifications.

What is claimed is:

1. An ignition system for a tandem-type hybrid vehicle, the tandem-type hybrid vehicle comprising a plurality of engines, the ignition system comprising:
   a plurality of ignition coils, each of the engines being configured to have at least one of the ignition coils, and each of the ignition coils comprising a primary winding and a secondary winding which are mutually matched;
   a single igniter provided with a plurality of output ports with the quantity corresponding to that of the plurality of ignition coils, each of the output ports being connected to the primary winding of one corresponding ignition coil so as to control the connection and disconnection of a current in the primary winding of the ignition coil; and
   an electronic control unit for determining, according to a current power demand of the tandem-type hybrid vehicle, the engine to be started in the plurality of engines, determining the ignition coil to be boosted in the ignition coils in the engine to be started and issuing a corresponding ignition instruction,
   wherein the single igniter controls, according to the ignition instruction, the connection and disconnection of the current in the primary winding of the corresponding ignition coil to be boosted.

2. The ignition system according to claim 1, further comprising:
   a plurality of spark plugs, each of the engines being configured to have the spark plugs with the quantity corresponding to that of cylinders of the engine.

3. The ignition system according to claim 2, wherein the secondary winding of each of the ignition coils is connected to one of the spark plugs so as to provide the spark plug with a high voltage required for sparkover individually.

4. The ignition system according to claim 2, wherein the secondary winding of each of the ignition coils is connected to two of the spark plugs so as to provide the two spark plugs with a high voltage required for sparkover simultaneously.

5. The ignition system according to claim 4, wherein the two cylinders in which the two spark plugs are located are configured such that, when one of the cylinders is in a compression stroke, the other is in an exhaust stroke.

6. The ignition system according to claim 1, wherein the electronic control unit is provided with ignition instruction output ports with the quantity corresponding to that of the plurality of ignition coils, each of the ignition instruction output ports being capable of transmitting, to the igniter, the corresponding one of the ignition instructions issued by the electronic control unit.

7. The ignition system according to claim 2, wherein the electronic control unit is provided with ignition instruction output ports with the quantity corresponding to that of the plurality of ignition coils, each of the ignition instruction output ports being capable of transmitting, to the igniter, the corresponding one of the ignition instructions issued by the electronic control unit.

8. The ignition system according to claim 3, wherein the electronic control unit is provided with ignition instruction output ports with the quantity corresponding to that of the plurality of ignition coils, each of the ignition instruction output ports being capable of transmitting, to the igniter, the corresponding one of the ignition instructions issued by the electronic control unit.

9. The ignition system according to claim 4, wherein the electronic control unit is provided with ignition instruction output ports with the quantity corresponding to that of the plurality of ignition coils, each of the ignition instruction output ports being capable of transmitting, to the igniter, the corresponding one of the ignition instructions issued by the electronic control unit.

10. The ignition system according to claim 5, wherein the electronic control unit is provided with ignition instruction output ports with the quantity corresponding to that of the plurality of ignition coils, each of the ignition instruction output ports being capable of transmitting, to the igniter, the corresponding one of the ignition instructions issued by the electronic control unit.

* * * * *

UNITED STATES PATENT AND TRADEMARK OFFICE
CERTIFICATE OF CORRECTION

PATENT NO. : 10,570,873 B2  
APPLICATION NO. : 15/557741  
DATED : February 25, 2020  
INVENTOR(S) : Li Page 1 of 1

It is certified that error appears in the above-identified patent and that said Letters Patent is hereby corrected as shown below:

On the Title Page

Item (71) Applicants:  
"ZHEJIANG GEELY HOLDING GROUP CO., LTD, Hangshou (CN)"  
Should read:  
--ZHEJIANG GEELY HOLDING GROUP CO., LTD, Hangzhou (CN)--.

Signed and Sealed this  
Nineteenth Day of May, 2020

Andrei Iancu  
*Director of the United States Patent and Trademark Office*